United States Patent [19]

Hinn

[11] Patent Number: 4,682,233
[45] Date of Patent: Jul. 21, 1987

[54] VIDEO OUTPUT SIGNAL CLAMPING CIRCUIT

[75] Inventor: Werner Hinn, Zollikerberg, Switzerland

[73] Assignee: RCA Corporation, Princeton, N.J.

[21] Appl. No.: 868,084

[22] Filed: May 29, 1986

[30] Foreign Application Priority Data

Oct. 1, 1985 [GB] United Kingdom ............... 8524199

[51] Int. Cl.<sup>4</sup> ............................................. H04N 5/18
[52] U.S. Cl. .................................. 358/173; 358/172; 358/171
[58] Field of Search ............... 358/171, 172, 173, 166, 358/34

[56] References Cited

U.S. PATENT DOCUMENTS

| | | | |
|---|---|---|---|
| 4,082,996 | 4/1978 | Hinn | 358/242 |
| 4,178,610 | 12/1979 | Constable et al. | 358/34 |
| 4,285,008 | 8/1981 | Osawa et al. | 358/65 |
| 4,442,458 | 4/1984 | Barter | 358/243 |
| 4,549,214 | 10/1985 | Hinn | 358/171 |

FOREIGN PATENT DOCUMENTS 2149610 6/1985 United Kingdom .

OTHER PUBLICATIONS

Partial schematic diagram of Model DC-1 video monitor manufactured by RCA Corporation.
Partial schematic diagram of Model DC-3 video Monitor Manufactured by RCA Corporation.

*Primary Examiner*—Tommy P. Chin
*Attorney, Agent, or Firm*—P. J. Rasmussen; P. M. Emanuel; R. H. Kurdyla

[57] ABSTRACT

In a wideband video signal processing system, a video signal is capacitively coupled to a kinescope via a signal path. A video signal clamping diode is coupled from the video signal path to a low impedance point in a feedback path of a keyed switching transistor. Parasitic capacitances associated with the clamping diode and with the output of the switching transistor are decoupled from the video signal path by means of a first decoupling resistor, and a second decoupling resistor included in the feedback path, respectively.

9 Claims, 1 Drawing Figure

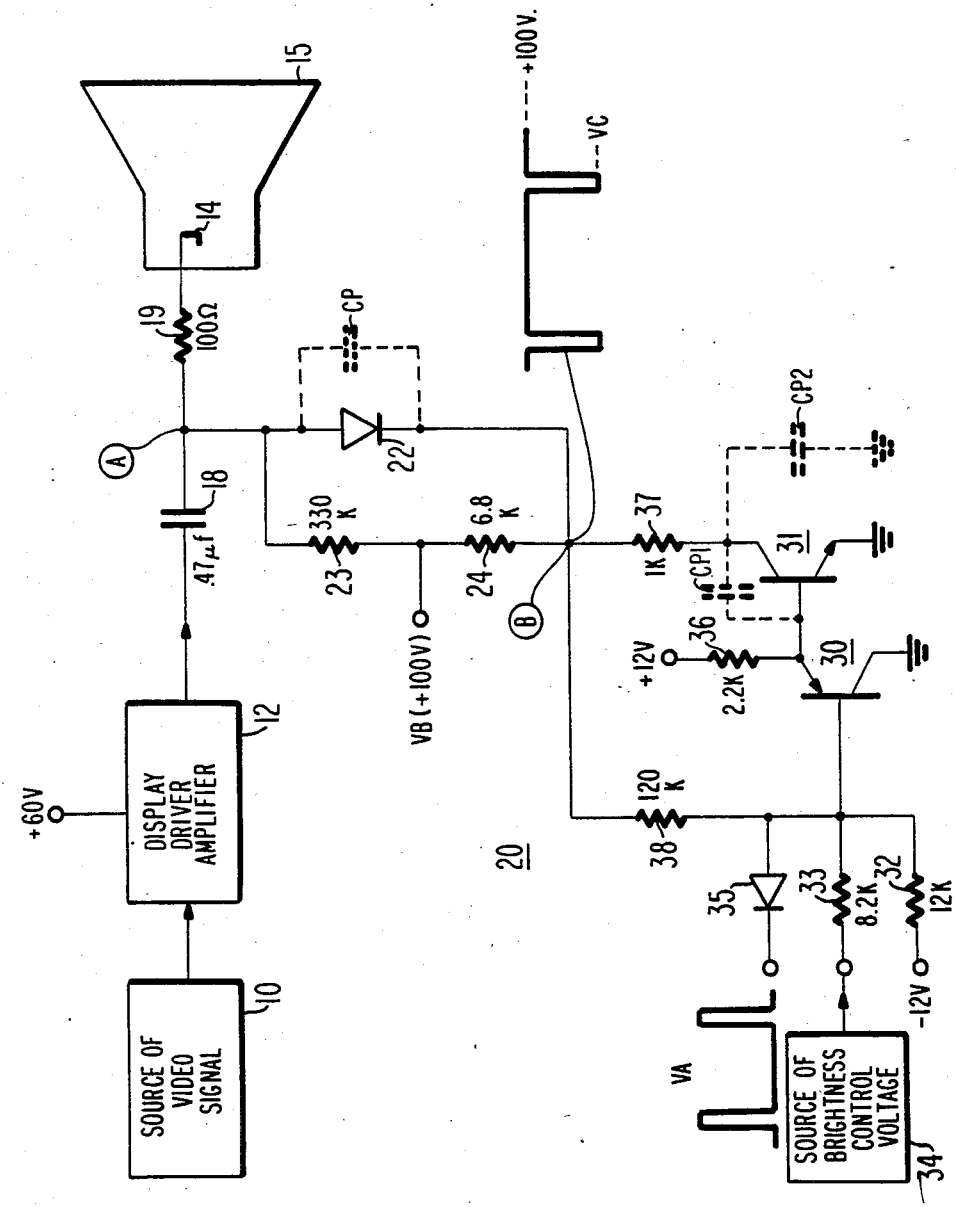

VIDEO OUTPUT SIGNAL CLAMPING CIRCUIT

This invention concerns a clamping circuit for restoring the DC component of a video signal in a video signal processing and display system such as a television receiver including an image displaying kinescope. In particular, this invention concerns a circuit for clamping the video output signal of a wide bandwidth display driver amplifier.

A conventional television receiver for processing broadcast television signals, e.g., according to NTSC broadcast standards as used in the United States, is intended to process video signal with a bandwidth limited to approximately 4.2 MHz at the high frequency extreme. A display driver amplifier for an image displaying kinescope in such a system must exhibit a corresponding bandwidth capability. Also in such a system, the DC bias for the signal input electrode of the kinescope is often related to the output DC bias condition of the driver amplifier, which may vary in accordance with the setting of an image brightness control of the system.

Recent trends toward high definition video signal display systems with significantly increased picture resolution capability, including high resolution television receivers and data display monitors, dictate the need for a video signal processing system with significantly wider signal bandwidth capability compared to conventional systems, and wide bandwidth display driver amplifiers in particular.

In a wideband display driver amplifier it is desirable to maintain a substantially fixed output DC bias condition for various reasons. Output bias variations such as produced in response to adjustment of bias controls including an image brightness control require a display driver operating supply voltage large enough to accommodate output DC level shifts associated with such adjustments. Large supply voltages are undesirable in a wideband display driver because of the resulting increased power consumption and dissipation which would result for a wideband driver which is often already operating at increased DC current levels. In addition, wideband driver transistors sometimes exhibit low voltage ratings which do not permit the use of a larger supply voltage required to accommodate DC output voltage shifts. Bias voltage variations also influence the capacitance parameters of the driver transistors, undesirably causing operating bandwidth variations with shifts in transistor DC bias. The driver transistor operating bandwidth capability also varies with the current gain of the transistor, which is a function of transistor bias current.

Consequently, wideband kinescope drivers often do not permit DC bias shifts such as would otherwise be required for brightness control, for example, and often employ capacitor (AC) coupling between the output of the kinescope driver stage and the kinescope. Such capacitor coupling requires a circuit for DC restoration and brightness control at the signal input electrode (e.g., the cathode electrode) of the kinescope. One type of video output DC restoration circuit employing a keyed clamping diode is disclosed for example in U.S. Pat. No. 4,285,008-Osawa et al.

Video output DC restoration circuits which employ a clamping diode exhibit one or more disadvantages. During active picture information intervals of the video signal the clamping diode is reverse biased and exhibits a capacitance which, depending on the diode type and the magnitude of the reverse bias voltage across the diode, can adversely affect the high frequency response of the video output signal path particularly in the case of a wideband system. Diode clamping circuits are also subject to introducing a signal dependent clamping error related to an offset voltage produced by signal dependent clamping current flowing through an impedance in series with the clamping diode.

A disclosed video output clamping circuit advantageously exhibits both reduced signal dependent clamping error, and reduced parasitic capacitance with respect to the video signal path. In a disclosed preferred embodiment in accordance with the principles of the present invention, a clamping diode is coupled to a capacitor which couples a video signal from the output of a display driver stage to an image display device. The clamping diode is also coupled to a low impedance output terminal of a degenerative feedback loop including a keyed switching device which determines the conductive state of the clamping diode. A coupling impedance, included in the feedback loop, couples the switching device to the output terminal. The low impedance output terminal leads to reduced signal dependent clamping errors, while the coupling impedance isolates the output terminal from any parasitic capacitance of the switching device, particularly when the switching device is non-conductive during non-clamping intervals.

In accordance with a feature of the invention, the brightness of a displayed image can be adjusted by varying the level of current conducted by the switching device, such as in response to voltage derived from a viewer adjustable source of brightness potential, in a manner which does not contribute to the development of signal dependent clamping errors.

The sole Figure of the drawing illustrates a portion of a wideband video signal processing and display system, including a video output DC restoration clamping circuit in accordance with the principles of the present invention.

A video signal from a source 10 is applied to a wideband (e.g., 100MHz) video output kinescope driver amplifier 12, which provides a high level output video signal suitable for driving the cathode intensity control electrode 14 of an image displaying kinescope 15. The video output signal is conveyed from the output of display driver 12 to cathode 14 via an AC coupling capacitor 18 and a current limiting resistor 19. Display driver amplifier 12 may, for example, comprise a cascode amplifier with an input common emitter amplifier stage and an output common base amplifier stage, as known.

A DC restoration clamping network 20 for restoring the DC level of the video ouput signal which is AC coupled via capacitor 18, in accordance with the present invention, is coupled to capacitor 18 at a node A in a kinescope cathode signal coupling path including resistor 19. Network 20 includes a keyed clamping diode 22 with an anode electrode coupled to node A in the video output signal path. A source of positive bias potential VB is applied to the junction of series connected resistors 23 and 24 which are connected between the anode and cathode electrodes of diode 22 for providing bias thereto.

Network 20 also includes cascade connected, opposite conductivity type switching transistors 30 and 31. A base input electrode of transistor 30 receives fixed bias via a resistor 32 and a source of bias voltage (-12v.), a variable bias via a resistor 33 and a source of variable bias potential 34, and a keying signal VA including positive pulse keying components coupled via a diode 35. In this example source 34 is a source of viewer adjustable brightness control potential for varying the brightness of a displayed image by varying the conduction of transistors 30 and 31 during clamping intervals when transistors 30 and 31 are rendered conductive in response to the positive pulse components of signal VA. Transistor 30 normally exhibits a saturated conductive state whereby transistor 31 is rendered nonconductive. During clamping intervals, transistor 30 is caused to operate in a linear conduction region in response to the positive pulse components of signal VA, thereby rendering transistor 31 conductive. Each positive pulse component of signal VA occurs during a clamping interval which in this case is the so-called 'back porch' interval following the synchronizing pulse interval within each horizontal line blanking interval.

An emitter circuit of emitter follower transistor 30 includes a resistor 36, and a collector output circuit of transistor 31 includes a decoupling resistor 37 which connects the collector output of transistor 31 to an output terminal B at the junction of resistor 24 and the cathode electrode of clamping diode 22. A feedback resistor 38 coupled from terminal B to the base input of transistor 30 comprises a negative feedback loop also including transistors 30, 31 and decoupling resistor 37.

During clamping intervals when the positive pulse components of signal VA appear, normally conductive diode 35 is rendered nonconductive and transistor 30 changes from its normally saturated conductive state to its linear conductive state, resulting in normally nonconductive transistor 31 being rendered conductive. At this time a pulse component VC appears at the collector of transistor 31 and at terminal B. The magnitude of such pulse component may be on the order of $°$volts to $\lambda$volts for example, as determined by the values of resistors 32, 33 and 38 and by the magnitude of the voltage from brightness control source 34. The setting of the brightness control in source 34 controls the conduction level of transistors 30 and 31, which in turn determines the magnitude of pulse component VC and the conduction level of clamp diode 22, for determining an image brightness related DC bias condition of the kinescope cathode signal path. Normally nonconductive clamping diode 22 is rendered conductive in response to clamping interval pulse VC such that the charge developed on capacitor 18 at node A is modified in accordance with the magnitude of clamping pulse VC. Thus the brightness related DC level of the cathode video signal path is clamped to a value in accordance with the value of the brightness control voltage from source 34.

Outside of the clamping intervals, i.e., during image trace intervals, diode 35 is forward biased into conduction by signal VA, and transistor 30 exhibits its normal saturated state. At this time a voltage substantially equal to VB ($\phi$volts) appears at terminal B, thereby reverse biasing clamping diode 22. The bias provided to the cathode of clamping diode 22 during non-clamping intervals is chosen to be large enough to assure that clamp diode 22 remains reverse biased (cut-off) for any video signal conditions expected to appear at node A in the video signal path. Such sufficient biasing of diode 22 outside of the clamping intervals avoids the need for special provisions in video circuits preceding display driver stage 12, such as clipping circuits, to keep amplitude excursions of the video signal from extending too far in the blacker-than-black direction, which would otherwise tend to render clamp diode 22 conductive. The keying of network 20 assists to assure that clamping action occurs only during the clamping intervals. Keyed clamping also assists to prevent the clamp from being activated during non-clamping intervals such as in response to noise pulses which may occur during image trace intervals.

Loading of the video output cathode signal coupling path by parasitic capacitance CP of reverse biased clamping diode 22 is virtually eliminated during image information display (trace) intervals because at such times transistor 31 is nonconductive and the cathode electrode of clamp diode 22 is coupled to a high resistance, substantially non-capacitive source comprising resistor 24 and voltage source VB. Specifically, at such times the feedback loop including transistors 30 and 31 and resistors 37 and 38 is open, and the impedance at terminal B in the collector circuit of nonconductive transistor 31 is essentially determined by the value of resistor 24. The parasitic capacitance of clamp diode 22 is no longer coupled via a low impedance to an AC ground point, but instead is connected to relatively high value decoupling resistor 24 which renders the parasitic capacitance of diode 22 ineffective with respect to the video signal path, thereby preserving the high frequency characteristics of the video output signal. The value of resistor 24 should be larger than the impedance exhibited by parasitic capacitance CP at the highest video frequency of interest.

It is noted that resistor 37 serves to isolate, or decouple, a collector-to-base parasitic capacitance CP1 of transistor 31, and a collector-to-ground parasitic capacitance CP2 of transistor 31, from terminal B and clamp diode 22. In the absence of resistor 37, i.e., if the collector of transistor 31 were connected directly to terminal B, the video signal path would be loaded by the series combination of the collector capacitances of transistor 31 and the parasitic capacitance of diode 22. The value of resistor 37 should be larger than the impedance exhibited by parasitic capacitances CP1 and CP2 at the highest video frequencies of interest.

During clamping intervals when transistors 30 and 31 conduct and the feedback loop is closed, the cathode electrode of clamp diode 22 is coupled to a low impedance source at terminal B so as to eliminate signal dependent clamping (offset) errors which would otherwise be developed due to signal dependent clamping current flowing through clamp diode 22 and any impedance in series with diode 22. Such low impedance at terminal B is approximately ten ohms or less and is produced by the feedback loop including transistors 30 and 31. Decoupling resistor 37 is not 'seen' by the clamping circuit including diode 22 and capacitor 18 during clamping intervals and does not contribute to the production of signal dependent clamping errors because resistor 37 is within the feedback loop also including elements 30, 31 and 38. The cathode of diode 22 sees only a low impedance. The desirable low impedance developed at terminal B during clamping intervals advantageously is not compromised as the brightness control in source 34, e.g., a potentiometer, is adjusted. The impedance at point B should be as low as possible. In this example the voltage at node B should be much smaller than 1.0 volt, as determined by the impedance at node B times the clamping current through diode 22.

What is claimed is:

1. In a system for processing a video signal having image and blanking intervals, said system including an image display device for displaying video information in response to a video signal applied to an intensity control electrode thereof, and a display driver amplifier, video signal clamping apparatus comprising:

- a capacitor for AC coupling a video signal from an output of said display driver amplifier;
- a video signal path for coupling said video signal from said capacitor to said intensity control electrode;
- a switching network including a switching device having an input electrode and an output electrode having an associated parasitic capacitance, and including a feedback path coupled from said output electrode to said input electrode of said switching device;
- a semiconductor clamping device having a first electrode coupled to said video signal path and a second electrode coupled to a point in said feedback path of said switching network, said clamping device being rendered conductive during said blanking interval and nonconductive during said image interval in response to conductive and nonconductive states of said switching means, respectively; and
- a decoupling impedance, included in said feedback path, connected between said second electrode of said clamping device and said output electrode of said switching means, for decoupling said parasitic capacitance associated with said output electrode of said switching device from said point in said feedback path.

2. Apparatus according to claim 1, wherein
said clamping device exhibits a parasitic capacitance when said clamping device exhibits said nonconductive state, said parasitic capacitance of said clamping device subject to being undesirably coupled from said video signal path to a reference potential; and
a further decoupling impedance is coupled from said second electrode of said clamping device to said reference potential to decouple said parasitic capacitance of said clamping device from said reference potential when said clamping device exhibits said nonconductive state.

3. Apparatus according to claim 1, wherein
said clamping device exhibits a conduction level related to the conduction level of said switching device during said blanking intervals for establishing a DC bias condition for said video signal path; and
a source of variable control potential is coupled to said switching device for controlling the conduction level thereof.

4. Apparatus according to claim 2, wherein said clamping device is a semiconductor PN junction device coupled between said video signal path and said point in said feedback path;
said parasitic capacitance of said clamping device appears across said PN junction device;
said switching device is a transistor with an input electrode, and output and common electrodes defining a main current conduction path of said transistor; and
control means is coupled to said input electrode for controlling the conduction level of said transistor.

5. In a system for processing a video signal having image and blanking intervals, said system including an image display device for displaying video information in response to a video signal applied to an intensity control electrode thereof, and a display driver amplifier, video signal clamping apparatus comprising:

- a capacitor for AC coupling said video signal from an output of said display driver amplifier;
- a video signal path for coupling said video signal from said capacitor to said intensity control electrode;
- a switching network including a switching device subject to exhibiting conductive and nonconductive states and having an input electrode and an output electrode, and including a feedback path coupled from said output electrode to said input electrode of said switching device;
- a semiconductor clamping device having a first electrode coupled to said video signal path and a second electrode coupled to a point in said feedback path of said switching network, and having an associated parasitic capacitance subject to being undesirably coupled from said video signal path to a reference potential; said clamping device being rendered conductive during said blanking interval and nonconductive during said image interval in response to said conductive and nonconductive states of said switching device, respectively; and
- a decoupling impedance is connnected from said second electrode of said clamping device to said reference potential to decouple said parasitic capacitance of said clamping device from said reference potential when said clamping device exhibits said nonconductive state.

6. Apparatus according to claim 5, wherein:
said clamping device exhibits a conduction level related to the conduction level of said switching device during said blanking intervals for establishing a DC bias condition for said video signal path; and
a source of variable control potential is coupled to said switching device for controlling the conduction level thereof.

7. Apparatus according to claim 5, wherein
said clamping device is a semiconductor PN junction device coupled between said video signal path and said point in said feedback path;
said parasitic capacitance of said clamping device appears across said PN junction device;
said switching device is a transistor with an input electrode, and output and common electrodes defining a main current conduction path of said transistor; and
control means is coupled to said input electrode for controlling the conduction level of said transistor.

8. In a system for processing a video signal having image and blanking intervals, said system including a kinescope for displaying video information in response to a video signal applied to a cathode electrode thereof, and a kinescope driver amplifier, video signal clamping apparatus comprising:

- a capacitor for AC coupling a video signal from an output of said driver amplifier;
- a video signal path for coupling a video signal from said capacitor to said cathode electrode;
- a switching network including a switching transistor having an input electrode and output and common electrodes defining a main current conduction path of said switching transistor, and including a feedback path coupled from said output electrode to said input electrode of said switching transistor; said output electrode having an associated parasitic capacitance;

a clamping diode having a first electrode coupled to said video signal path and a second electrode coupled to a point in said feedback path, and exhibiting a parasitic capacitance when said diode exhibits a nonconductive state, said parasitic capacitance of said diode subject to being undesirably coupled from said video signal path to a reference potential; said diode being rendered conductive during said blanking interval and nonconductive during said image interval in response to conductive and nonconductive states of said switching transistor, respectively;

a decoupling resistor, included in said feedback path, connected between said second electrode of said diode and said output electrode of said switching transistor, for decoupling said parasitic capacitance of said switching transistor from said point in said feedback path; and a further decoupling resistor connected from said second electrode of said diode to said reference potential to decouple said parasitic capacitance of said diode from said reference potential when said diode exhibits said nonconductive state.

9. Apparatus according to claim 8, wherein control means is coupled to said input electrode of said switching transistor for controlling the conduction level thereof.

* * * * *